(12) United States Patent
Zhang et al.

(10) Patent No.: US 10,075,995 B2
(45) Date of Patent: Sep. 11, 2018

(54) OPTIMIZED PROCEDURE FOR USER EQUIPMENT AUTONOMOUS MOBILITY

(71) Applicant: Nokia Solutions and Networks Oy, Espoo (FI)

(72) Inventors: Yan Ji Zhang, Beijing (CN); Ilkka Keskitalo, Oulu (FI); Jussi-Pekka Koskinen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 76 days.

(21) Appl. No.: 15/024,876

(22) PCT Filed: Sep. 24, 2014

(86) PCT No.: PCT/EP2014/070371
§ 371 (c)(1),
(2) Date: Mar. 25, 2016

(87) PCT Pub. No.: WO2015/044201
PCT Pub. Date: Apr. 2, 2015

(65) Prior Publication Data
US 2016/0249402 A1    Aug. 25, 2016

Related U.S. Application Data

(60) Provisional application No. 61/883,403, filed on Sep. 27, 2013.

(51) Int. Cl.
*H04W 76/19* (2018.01)
*H04W 36/36* (2009.01)
(Continued)

(52) U.S. Cl.
CPC .......... *H04W 76/19* (2018.02); *H04W 36/36* (2013.01); *H04W 68/08* (2013.01); *H04W 76/27* (2018.02);
(Continued)

(58) Field of Classification Search
CPC . H04W 76/028; H04W 76/046; H04W 68/08; H04W 88/08; H04W 88/02; H04W 48/20
See application file for complete search history.

(56) References Cited

U.S. PATENT DOCUMENTS

2013/0039339 A1*  2/2013  Rayavarapu ........ H04W 76/028
                                                      370/331

FOREIGN PATENT DOCUMENTS

EP    2 557 890 A1    2/2013
EP    2 698 930 A2    2/2014

OTHER PUBLICATIONS

3GPP TSG-RAN WG2 Meeting #83, Aug. 19-23, 2013, Barcelona, Spain, R2-132687, "Mobility aspects of small data transmission", BlackBerry UK Ltd., 5 pgs.
(Continued)

*Primary Examiner* — Pao Sinkantarakorn
*Assistant Examiner* — Kabir Jahangir
(74) *Attorney, Agent, or Firm* — Harrington & Smith

(57) ABSTRACT

Exemplary embodiments including a method including determining a user equipment of a wireless communication network is in an autonomous mobility mode; receiving an indication from the wireless communication network of a data communication available for the user equipment; and based on the indication, establishing a connection between the user equipment and a network node of the wireless communication network. Apparatus, program products, and software to perform the exemplary embodiments are also disclosed.

15 Claims, 10 Drawing Sheets

(51) Int. Cl.
*H04W 68/08* (2009.01)
*H04W 76/27* (2018.01)
*H04W 48/20* (2009.01)
*H04W 88/02* (2009.01)
*H04W 88/08* (2009.01)

(52) U.S. Cl.
CPC ............ *H04W 48/20* (2013.01); *H04W 88/02* (2013.01); *H04W 88/08* (2013.01)

(56) References Cited

OTHER PUBLICATIONS

3GPP TSG-RAN WG2 Meeting #83, Barcelona, Spain, Aug. 19-23, 2013, R2-132838, "Summary of email discussion [82#I2] [JointMTCe] Signalling gain elevation for SDDTE", ZTE Corp., 26 pgs.

3GPP TSG-RAN WG2 Meeting #83, Barcelona, Spain, Aug. 19-23, 2013, R2-132891, "Small Packet Transmissions in Semi-idle State", Renesas Mobile Europe Ltd., 8 pgs.

3GPP TR 23.887 V1.1.0 (Jul. 2013), "3$^{rd}$ Generation Partnership Project; Technical Specification Group Services and System Aspects; Machine-Type and other Mobile Data Applications Communications Enhancements (Release 12)", 153 pgs.

3GPP TR 37.869 V12.0.0 (Sep. 2013), "3$^{rd}$ Generation Partnership Project; Technical Specification Group Radio Access Network; Study on Enhancements to Machine-Type Communications (MTC) and other Mobile Data Applications; Radio Access Network (RAN) aspects (Release 12)", 43 pgs.

\* cited by examiner

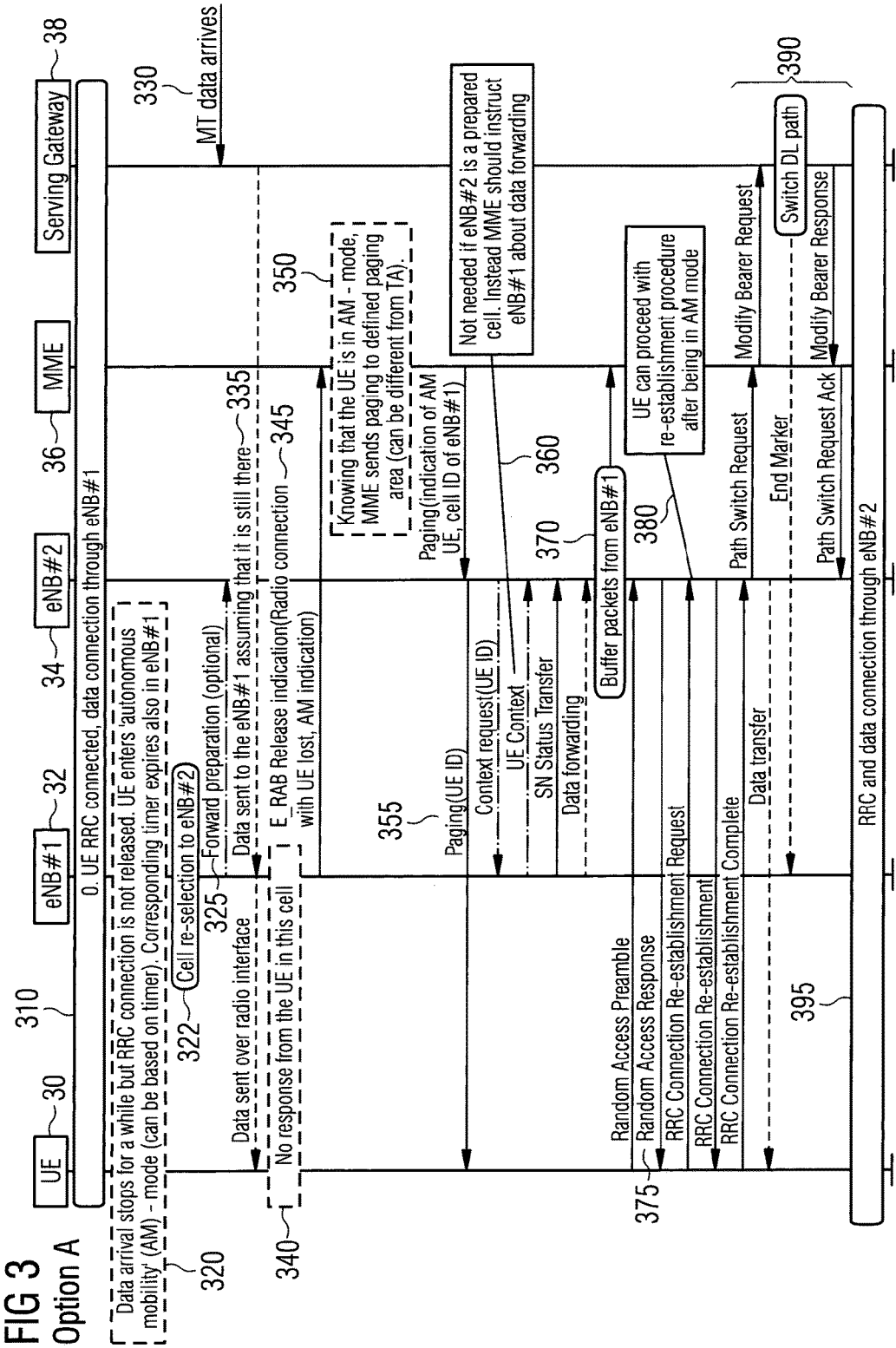

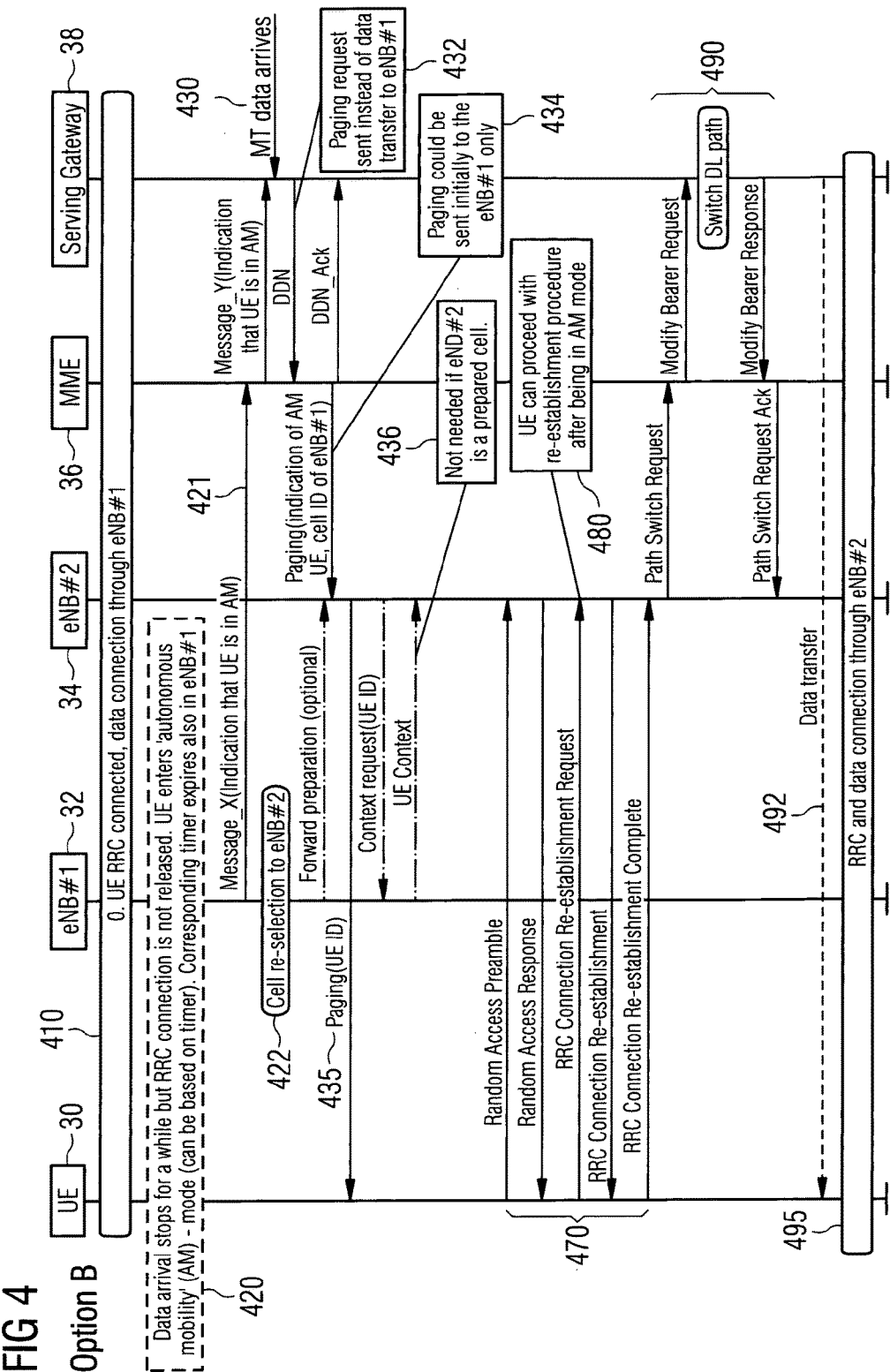
FIG 4 Option B

Option C

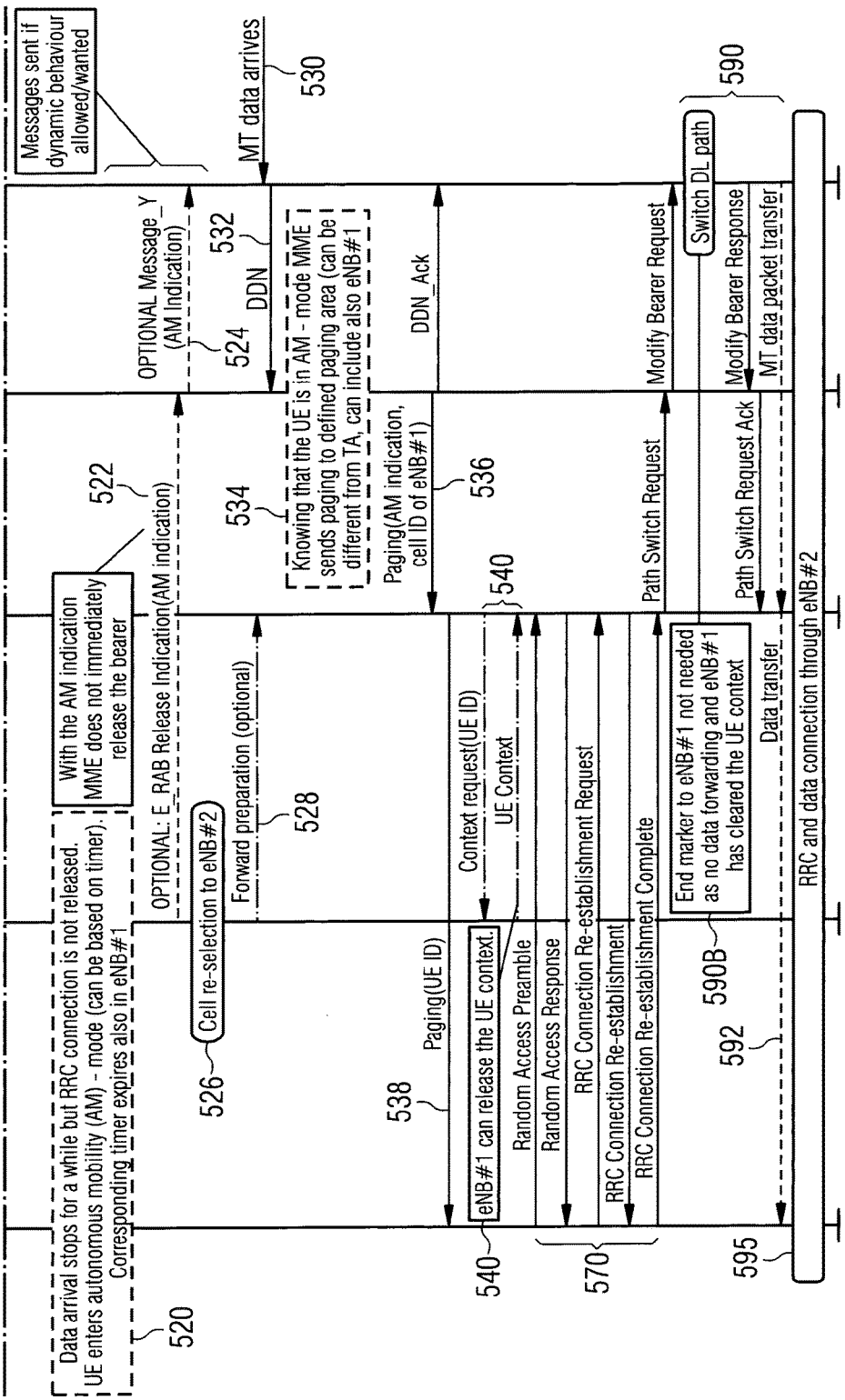
FIG 5B Option C

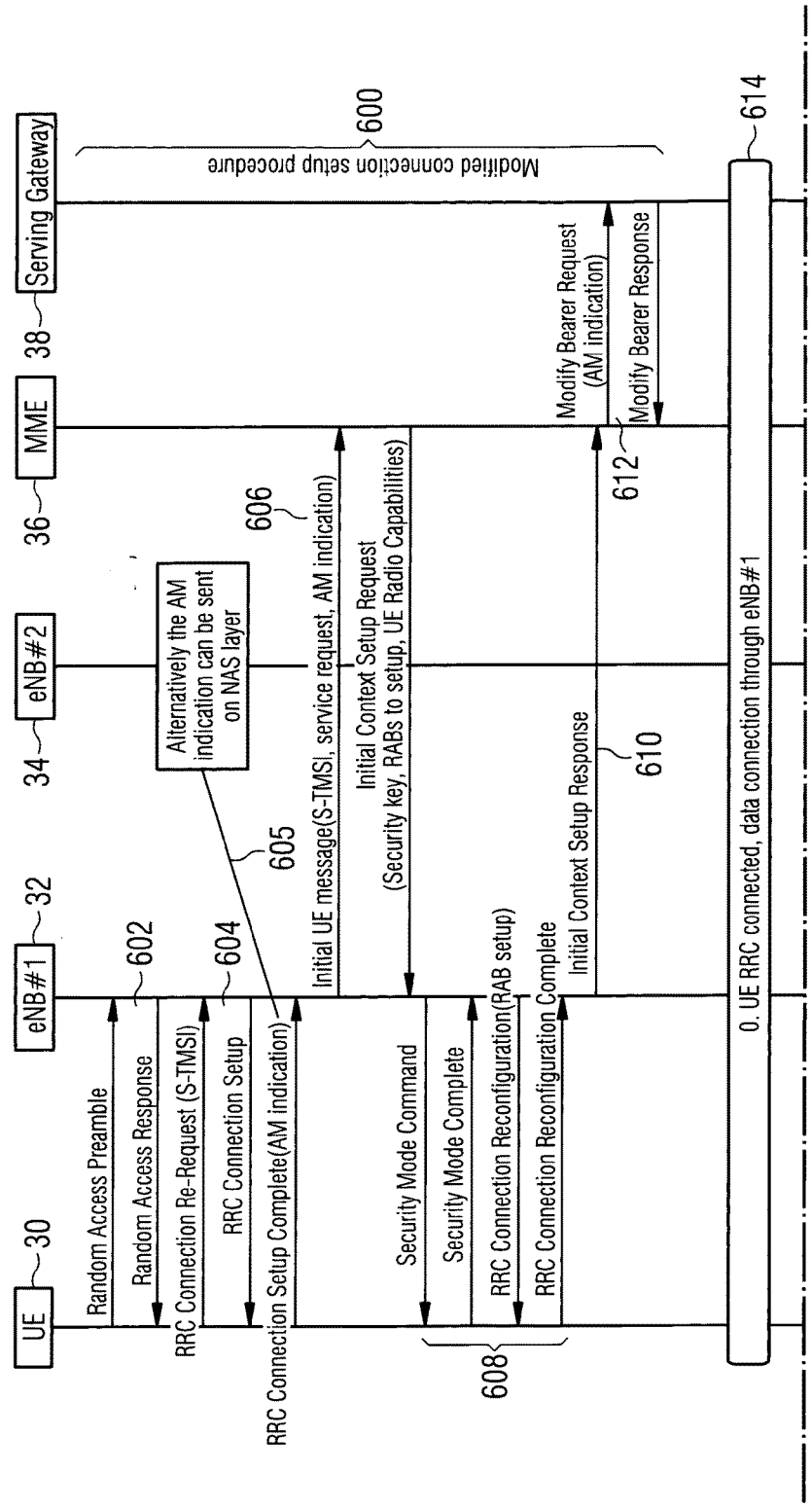

Modified Option C

OPTIMIZED PROCEDURE FOR USER EQUIPMENT AUTONOMOUS MOBILITY

TECHNICAL FIELD

The teachings in accordance with the exemplary embodiments of this invention relate generally to optimizing mobile terminated data transfer to a device, and more specifically relate to optimizing a reactivation of mobile terminated data transfer when applying user equipment controlled mobility mode.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
  UE user equipment
  HO handover
  eNB enhanced NodeB
  MTC machine type communication
  RRC radio resource control
  LTE long term evolution, a.k.a. E-UTRA
  MME mobility management entity
  SGW serving gateway The mobility of user equipment in terms of handover or cell reselection can be network controlled or user equipment controlled. In a network controlled mobility mode, network devices such as the radio base station (RBS, eNB) and/or a radio network controller (RNC) control moving the user equipment from one cell to another. The network controlled mobility mode is typically user equipment assisted as the user equipment measures the signal strengths of neighboring cells, and provides measurement reports to the network. In view of these reports the network device determines whether a handover should be executed.

In a user equipment controlled mobility mode, the user equipment may autonomously perform cell reselection. For example the user equipment is free to select a cell to move to in consideration of measurements of signals from multiple cells potentially including selection criteria and thresholds. The criteria and thresholds'can be provided by the network.

Wireless communication systems can deploy both network controlled mobility and user equipment controlled mobility solutions. In LTE for example, radio resource control (RRC) protocol is modeled with two states— RRC_IDLE and RRC_CONNECTED. In the RRC_IDLE state the user equipment controlled mobility is implemented in which the user equipment performs the measurements and the cell reselection. In the RRC_CONNECTED state, the network controlled mobility is implemented in which the network is in control of when the handover and cell reselection for the user equipment occurs.

The exemplary embodiments of the invention provide novel operations which work to achieve advantages including at least a minimizing of signaling overhead and user equipment power consumption such as in user equipment controlled mobility mode.

SUMMARY

This section contains examples of possible implementations and is not meant to be limiting.

In one exemplary embodiment, there is a method comprising determining a user equipment of a wireless communication network is in an autonomous mobility mode; receiving an indication from the wireless communication network of a data communication available for the user equipment; and based on the indication, establishing a connection between the user equipment and a network node of the wireless communication network.

A further exemplary embodiment is the method comprising the method of the previous paragraph, where there is a radio resource control connection between the user equipment and the network node, and where information for the radio resource control connection is maintained during the autonomous mobility mode. A further exemplary embodiment is the method(s) of this paragraph and/or the previous paragraph where the establishing comprises reestablishing based on the indication the radio resource control connection between the user equipment and the network node. In yet another exemplary embodiment is the method(s) of this paragraph and/or the previous paragraph where the determining comprises communicating an indication of the autonomous mobility mode of the user equipment with the wireless communication network. In another exemplary embodiment is the method(s) of this paragraph and/or the previous paragraph where the communicating is towards one of a mobility management entity and a serving gateway of the wireless communication network. In yet another exemplary embodiment is the method(s) of this the paragraph and/or the previous paragraph a cell reselection to a target cell is initiated by the user equipment in the autonomous mobility mode while the connection is established. In yet another exemplary embodiment is the method(s) of this paragraph and/or the previous paragraph the target cell is made aware of the autonomous mobility mode such that the target cell is enabled to proceed with re-establishment signaling. In still another exemplary embodiment is the method(s) of this paragraph and/or the previous paragraph, the indication from the wireless communication network comprises a page directed to a defined paging area associated with multiple cells, where the multiple cells can comprise a source cell. In yet another exemplary embodiment is the method(s) of this paragraph and/or the previous paragraph, where the network node is associated with another cell, and the method further comprising communicating with the another cell a release message and forward preparation data for the cell reselection for the user equipment. In another exemplary embodiment is the method(s) of this the paragraph and/or the previous paragraph, the network node is a serving gateway of the wireless communication network. In another exemplary embodiment is the method(s) of this paragraph and/or the previous paragraph, the determining is based on a stoppage of a data communication between the user equipment and the network node. In yet another exemplary embodiment is the method(s) of this paragraph and/or the previous paragraph the determining is based on an expiration of a timer associated with the stoppage of the data communication between the user equipment and the network node. In yet another exemplary embodiment is the method(s) of this paragraph and/or the previous paragraph an indication of the autonomous mobility mode for the user equipment is communicated with the wireless communication network based on the stoppage. In another exemplary embodiment is the method(s) of this paragraph and/or the previous paragraph the indication is communicated with at least one of a mobility management entity, a serving gateway via a mobility management entity, and directly to a serving gateway. In another exemplary embodiment is the method(s) of this paragraph and/or the previous paragraph the indication is communicated using control plane signaling. In yet another exemplary embodiment is the method(s) of this paragraph and/or the previous paragraph the method(s) performed by one of the user equipment and the network node. In yet another exemplary embodiment is the method(s) of this paragraph and/or the previous paragraph the establishing enables communicating the data communication with the user equipment.

In another exemplary embodiment, an apparatus comprises means for determining a user equipment of a wireless communication network is in an autonomous mobility mode; means for receiving an indication from the wireless communication network of a data communication available for the user equipment; and means, based on the indication, for establishing a connection between the user equipment and a network node of the wireless communication network.

A further exemplary embodiment is an apparatus as in the previous paragraph, where there is a radio resource control connection between the user equipment and the network node, and where information for the radio resource control connection is maintained during the autonomous mobility mode. A further exemplary embodiment is the apparatus of this paragraph and/or the previous paragraph where the means for establishing comprises means for reestablishing based on the indication the radio resource control connection between the user equipment and the network node. A further exemplary embodiment is the apparatus of this paragraph and/or the previous paragraph where the means determining comprises means for communicating an indication of the autonomous mobility mode of the user equipment with the wireless communication network. Still another exemplary embodiment is the apparatus of this the paragraph and/or the previous paragraph, where the communicating is towards one of a mobility management entity and a serving gateway of the communication network. Yet another exemplary embodiment is the apparatus of this paragraph and/or the previous paragraph, where the means for establishing comprises means for a cell reselection for the user equipment to another cell of the wireless communication network. A further exemplary embodiment is the apparatus of this paragraph and/or the previous paragraph, where the indication from the wireless communication network comprises a page directed to a defined paging area associated with the another cell. Another exemplary embodiment is the apparatus of this paragraph and/or the previous paragraph, where the network node is associated with the another cell, and further comprising means for communicating with the another cell a release message and means for forwarding preparation data for the cell reselection for the user equipment. A further exemplary embodiment is the apparatus of this paragraph and/or the previous paragraph, where the determining is based on a stoppage of a data communication between the user equipment and the network node. Still another exemplary embodiment is the apparatus of this paragraph and/or the previous paragraph, where the determining is based on an expiration of a timer associated with the stoppage of the data communication between the user equipment and the network node. Yet another exemplary embodiment is the apparatus of this paragraph and/or the previous paragraph, where an indication of the autonomous mobility mode for the user equipment is communicated with the wireless communication network based on the stoppage.

In another exemplary embodiment is the apparatus of this paragraph and/or the previous paragraph, the network node is a serving gateway of the wireless communication network. Still another exemplary embodiment is the apparatus of this paragraph and/or the previous paragraph, where the establishing enables communicating the data communication with the user equipment. In another exemplary embodiment the apparatus of this paragraph and/or the previous paragraph is embodied in one of the user equipment and the network node.

In a further exemplary embodiment of the invention an apparatus comprises one or more processors and one or more memories including computer program code. The one or more memories and the computer program code configured with the one or more processors to cause the apparatus to perform at least the steps in the paragraphs above including determining a user equipment of a communication network is in an autonomous mobility mode; receiving an indication from the wireless communication network of a data communication available for the user equipment; and based on the indication, establishing a connection between the user equipment and a network node of the wireless communication network.

Another exemplary embodiment comprises computer program code comprising code for performing at least the operations of the paragraphs above and determining a user equipment of a wireless communication network is in an autonomous mobility mode; receiving an indication from the wireless communication network of a data communication available for the user equipment; and based on the indication, establishing a connection between the user equipment and a network node of the wireless communication network.

In a further exemplary embodiment of the invention there is a method comprising: receiving, at a serving gateway of a wireless communication network, an indication that a user equipment of a communication network is in an autonomous mobility mode; and receiving from the wireless communication network a data communication available for the user equipment.

A further exemplary embodiment is the method comprising the method of the previous paragraph, where the indication is received from a mobile management entity of the wireless communication network. In another further exemplary embodiment is the method comprising the method of the previous paragraph, the indication from the mobile management entity is using control plane signaling. A further exemplary embodiment is the method(s) of this paragraph and/or the previous paragraph including sending, based on the receiving, a downlink data notification towards the mobile management entity, where the downlink data notification to the mobile management entity comprises a page request for a page regarding the data communication. Still further exemplary embodiment is the method(s) of this paragraph and/or the previous paragraph where the page is directed to a defined paging area. Still another exemplary embodiment is the method(s) of this paragraph and/or the previous paragraph including receiving a release message, where the defined paging area is associated with one of a last known location of the user equipment and a new cell reselected for the user equipment.

In another exemplary embodiment, an apparatus comprises means for receiving, at a serving gateway of a wireless communication network, an indication that a user equipment of a communication network is in an autonomous mobility mode; and means for receiving from the wireless communication network a data communication available for the user equipment.

A further exemplary embodiment is an apparatus as in the previous paragraph, where the indication is received from a mobile management entity of the wireless communication network. A further exemplary embodiment is the apparatus of this paragraph and/or the previous paragraph, where the indication from the mobile management entity is using control plane signaling. A further exemplary embodiment is the apparatus of this paragraph and/or the previous paragraph including means for sending, based on the receiving, a downlink data notification towards the mobile management entity, where the downlink data notification to the mobile management entity comprises a page request for a page regarding the data communication. Still further exemplary embodiment is the apparatus of this paragraph and/or the previous paragraph where the page is directed to a defined paging area. A further exemplary embodiment is the apparatus of this paragraph and/or the previous paragraph including means for receiving a release message, where the defined paging area is associated with one of a last known location of the user equipment and a new cell reselected for the user equipment.

In a further exemplary embodiment of the invention an apparatus comprises one or more processors and one or more memories including computer program code. The one or more memories and the computer program code configured with the one or more processors to cause the apparatus to perform at least the steps in the paragraphs above including receiving, at a serving gateway of a wireless communication network, an indication that a user equipment of a communication network is in an autonomous mobility mode; and receiving from the wireless communication network a data communication available for the user equipment.

Another exemplary embodiment comprises computer program code comprising code for performing at least the operations of the paragraphs above and receiving, at a serving gateway of a wireless communication network, an indication that a user equipment of a communication network is in an autonomous mobility mode; and receiving from the wireless communication network a data communication available for the user equipment.

In one exemplary embodiment, there is a method comprising receiving, at a mobile management entity of a wireless communication network, an indication that a user equipment of a communication network is in an autonomous mobility mode; and receiving, at the mobile management entity, a page request from a serving gateway of the wireless communication network, where the page request relates to a data communication available for the user equipment in the autonomous mode.

A further exemplary embodiment is the method comprising the method of the previous paragraph, where the page request comprises a downlink data notification and where the page request is using control plane signaling. A further exemplary embodiment is the methods) of this paragraph and/or the previous paragraph including sending, based on the page request, a page towards the wireless communication network indicating that the data communication is available for the user equipment. A further exemplary embodiment is the method(s) of this paragraph and/or the previous paragraph where the page is directed to a defined paging area.

In another exemplary embodiment, an apparatus comprises means for receiving, at a mobile management entity of a wireless communication network, an indication that a user equipment of a communication network is in an autonomous mobility mode; and means for receiving, at the mobile management entity, a page request from a serving gateway of the wireless communication network, where the page request relates to a data communication available for the user equipment in the autonomous mode.

A further exemplary embodiment is an apparatus as in the previous paragraph, where the page request comprises a downlink data notification and where the page request is using control plane signaling. A further exemplary embodiment is the apparatus of this paragraph and/or the previous paragraph, including means for sending, based on the page request, a page towards the wireless communication network indicating that the data communication is available for the user equipment. A further exemplary embodiment is the apparatus of this paragraph and/or the previous paragraph, where the page is directed to a defined paging area.

In a further exemplary embodiment of the invention an apparatus comprises one or more processors and one or more memories including computer program code. The one or more memories and the computer program code configured with the one or more processors to cause the apparatus to perform at least the steps in the paragraphs above including receiving, at a mobile management entity of a wireless communication network, an indication that a user equipment of a communication network is in an autonomous mobility mode; and receiving, at the mobile management entity, a page request from a serving gateway of the wireless communication network, where the page request relates to a data communication available for the user equipment in the autonomous mode.

Another exemplary embodiment comprises computer program code comprising code for performing at least the operations of the paragraphs above and receiving, at a mobile management entity of a wireless communication network, an indication that a user equipment of a communication network is in an autonomous mobility mode; and receiving, at the mobile management entity, a page request from a serving gateway of the wireless communication network, where the page request relates to a data communication available for the user equipment in the autonomous mode.

BRIEF DESCRIPTION OF THE DRAWINGS

The foregoing and other aspects of embodiments of this invention are made more evident in the following Detailed Description, when read in conjunction with the attached Drawing Figures, wherein:

FIGS. 3, 4, 5, and 6 are each mobility scenario signaling diagrams for showing operations of at least user equipment, base station(s), and a mobile management entity in accordance with the exemplary embodiments of the invention.

DETAILED DESCRIPTION

Figure 1A:
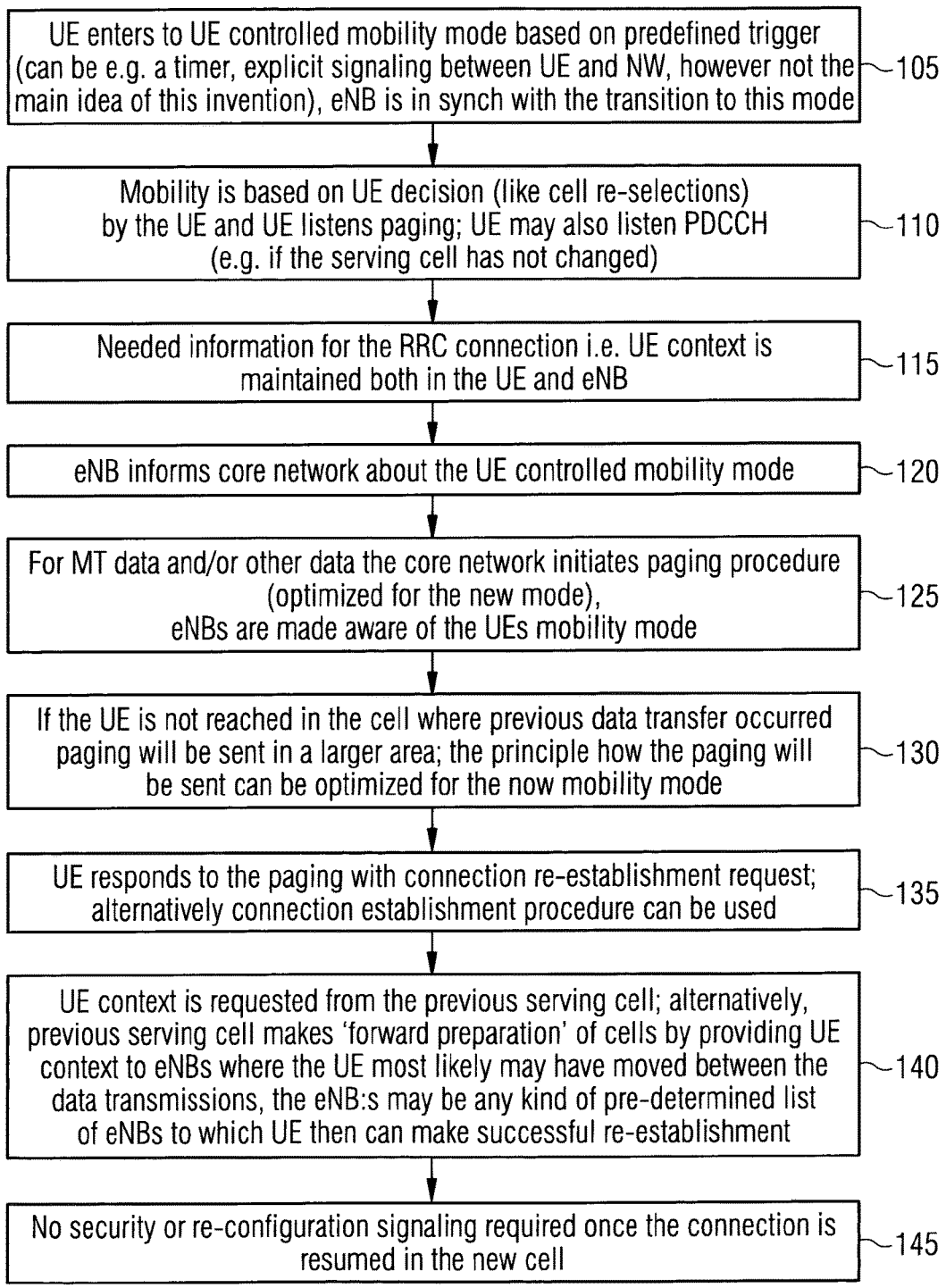
FIG. 1A is a simplified block diagram to identify novel features in accordance with the exemplary embodiments of the invention.

The 3GPP standards body has studied solutions that would minimize signaling overhead and user equipment (UE) power consumption with infrequent small data transfer. Such traffic is typical especially for Machine Type Communication (MTC) devices but also for smart phone when they generate only background traffic (MTC study item for Rel. 12). The inter-arrival of traffic bursts may vary a lot. For example, MTC devices it can be of some tens of seconds, minutes, days or even weeks, whereas with smart phones the interval is typically counted in seconds or tens of seconds. The data amount per burst may be small which may result in high signaling overhead compared to payload data.

With such traffic characteristics one option to minimize signaling overhead is to release the connection soon after the data transfer. By this connected state mobility signaling can be reduced. However, this is done at the cost of increased state transition signaling i.e. connection release and setup signaling. In order to reduce simultaneously both mobility and state transition signaling, it has been proposed to allow UE controlled mobility a.k.a. autonomous mobility for the RRC connected UE until new data transfer begins. Such an option is included in the RAN2 TR 37.869 and in separate contributions (e.g., R2-132687, R2-132838). There is also relation to proposal for semi idle state where the new state is fairly close to the mode of the UE controlled mobility, (e.g., R2-132401).

Contributed results (R2-132838) indicate that with the UE controlled mobility, there is possibility to achieve minimized signaling overhead in wide range of traffic and mobility scenarios. This is based on the simulations/calculations mainly with mobile originated (MO) data. What may, however, require optimization and advanced features is the procedure to resume the data transmission (after being in UE controlled mobility mode) for mobile terminated (MT) data transfer.

The exemplary embodiments of the invention provide a new option for optimizing the re-activation of mobile terminated (MT) data and/or other data transfer when the applying UE controlled mobility mode.

If a UE is allowed to move autonomously to another cell when in an RRC connected mode (i.e., UE context is maintained both at the UE and on the network side), there should be a defined trigger when the UE is allowed to enter the UE controlled mobility mode. One simple option may be to use a specific timer started at the completion of latest data transfer. This timer would be started both in the UE and in the eNB so that both network elements are kept synchronized with the used operational mode.

When the UE transits to the UE controlled mobility mode, the network cannot be certain of the UE location when MT data arrives. Normally, with full HO procedures the mobility is fully in network control i.e. the location (in cell resolution) is all the time known by the network. Or if the UE can no longer be reached in that cell in idle mode, network would normally send a paging message in the whole tracking area. As this is not the case with UE controlled mobility mode, network is only aware of the last cell where data transfer has taken place. From the network point of view, there should be principles defined how to initiate paging procedure (normally sent by MME) when UE has entered the UE controlled mobility mode, of which only the eNB is aware of. If the UE is not reached by the original eNB, the eNB itself cannot send paging to a wider area than its own cell.

It is noted that as similarly stated above in an autonomous mobility mode or a UE controlled mobility mode, the user equipment may autonomously perform cell reselection. For example in this autonomous mobility mode the user equipment is free to select a cell to move to in consideration of measurements of signals from multiple cells potentially including selection criteria and thresholds. The criteria and thresholds can be provided by the network. The user equipment may report to the new cell or to the cell area when the cell reselection is completed, but this is not a strict requirement with the autonomous mobility mode. In accordance with an exemplary embodiment a general idea is that in the autonomous mobility mode the UE or mobile device does cell re-selections and for example performs idle mode mobility while in a connected state such as when an RRC connection is kept.

An exemplary embodiment of the invention focuses on providing principles how the paging procedure is initiated in order to reach optimum behavior with minimized changes to the specifications and with minimized complexity increase.

Figure 1B:
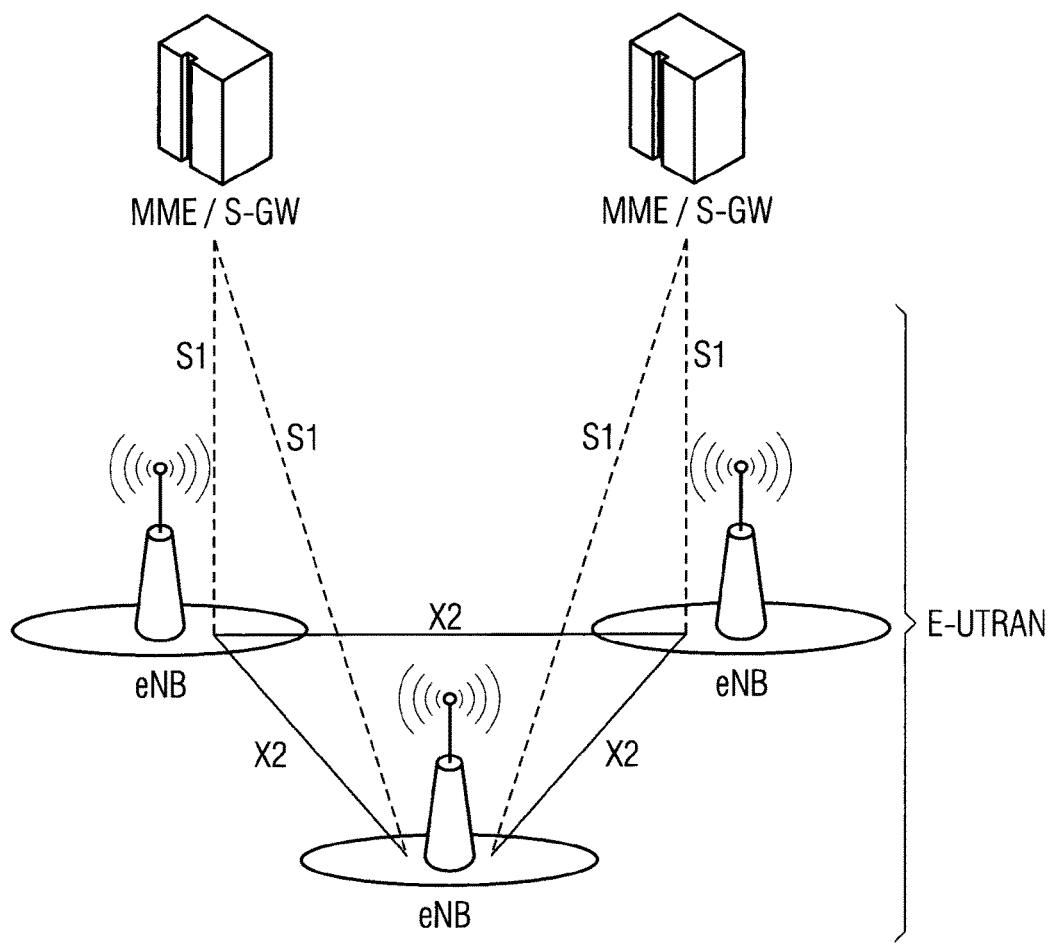
FIG. 1B shows an overall wireless communication architecture where eNBs communicate with MME/UPE entities via an S1 interface, and communicate with one another via X2 interfaces.
Figure 2:
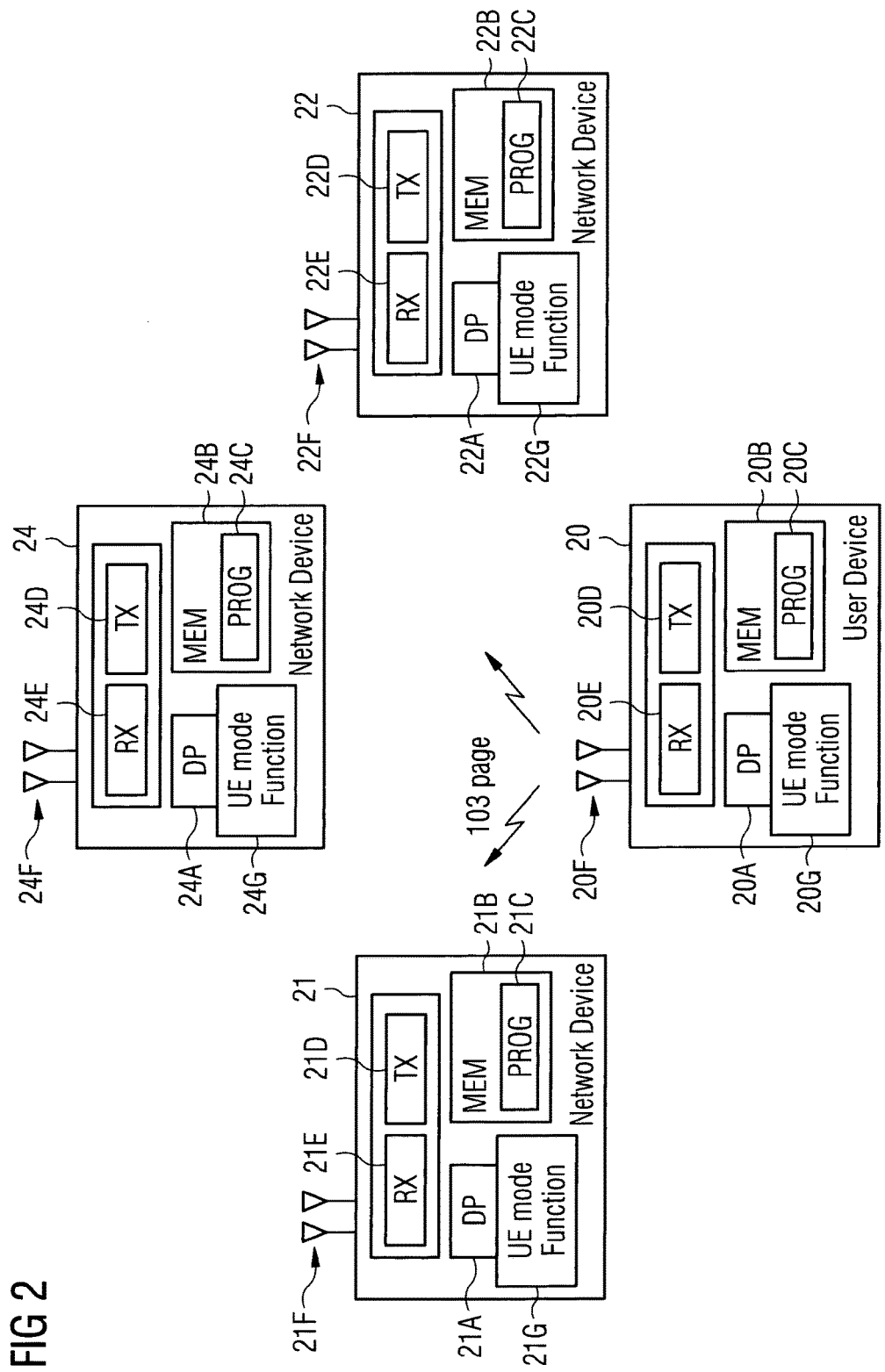
FIG. 2 shows a simplified block diagram of exemplary electronic devices that are suitable for use in practicing various exemplary embodiments of this invention.

A reference is now made to FIG. 2 for illustrating a simplified block diagram of various electronic devices and apparatus that are suitable for use in practicing the exemplary embodiments of this invention. In FIG. 2 a user device 20 is adapted for communication over wireless links (not specifically shown) with network devices, such as network node 21, 22 and 24. The network node 21, 22, or 24 can be a base station (eNB), a mobile management entity (MME), or any WiFi device enabled to operate in accordance with the exemplary embodiments of the invention as described above. It is noted that the network devices 21, 22, and 24 may include a network control element (NCE) that may include the MME/SGW functionality, also as shown in FIG. 1B, and which provides connectivity with a further network, such as a telephone network and/or a data communications network (e.g., the Internet). In accordance with the exemplary embodiments of this invention the eNBs, such as the network devices 21, 22, and/or 24, may exchange at least cell and/or UE mode related information over the X2 interface. As an alternative to using the X2 interface for exchanging such information, the network devices may report the information regarding a cell or cells under the eNB to another entity, such as an O&M (operations and maintenance) server, and the O&M server in this case can report the information to the neighboring eNB. It is also within the scope of the exemplary embodiments to use both cell-related information reporting techniques, i.e., to report information such as UE mode information via the X2 interface (perhaps information where a longer latency time would be a disadvantage), and to report other information (perhaps less time critical) via another agency, such as the O&M server or other device.

The network device 21, 22, 24, and/or user device 20 can be any device in a wireless communication network enabled to operate in accordance with the exemplary embodiments of the invention as described above. A network device, such as the network devices 21, 22, and/or 24 may be embodied in a network node of a communication network, such as embodied in a base station of a cellular network or another device of the cellular network. In one particular implementation, any of the network devices 21 and 22 may be embodied in a cellular device as a base station (referred to as eNB#1 32 or eNB#2 34 as in FIGS. 3, 4, 5, and 6), the network device 24 may be embodied as an MME (referred to as MME 36 as in FIGS. 3, 4, 5, and 6), and the user device 20 may be any wireless communication device (referred to as UE 30 as in FIGS. 3, 4, 5, and 6).

The user device 20 includes processing means such as at least one data processor (DP) 20A, storing means such as at least one computer-readable memory (MEM) 20B storing at least one computer program (PROG) 20C, and may also comprise communicating means such as a transmitter TX 20D and a receiver RX 20E for bidirectional wireless communications with the network device 24 via one or more antennas 20F. Such communications via the antenna 20F can include at least paging and/or UE mode indication signaling as in accordance with the exemplary embodiments. Further, the user device 20 incorporates a UE mode function 20G which is coupled to at least the DP 20A, the MEM 20B and the PROG 20C of the network node 20. The UE mode function 20G to be used with at least the MEM 20B and DP 20A to transmit an indication of an autonomous mobility mode (AM) or user equipment controlled mobility mode, as in accordance with the exemplary embodiments of the invention as at least described herein.

The network device 21 similarly includes processing means such as at least one data processor (DP) 21A, storing means such as at least one computer-readable memory (MEM) 21B storing at least one computer program (PROG) 21C, and may also comprise communicating means such as a transmitter TX 21D and a receiver RX 21E for bidirectional wireless communications with other apparatus of FIG. 2 via one or more antennas 21F. Such communications via the antenna 21F can include at least paging and/or UE mode indication signaling as in accordance with the exemplary embodiments. Using the user mode function 21G, the network device 21 is at least enabled to perform the exemplary operations including at least processing the indication of autonomous mobility mode (AM) or user equipment controlled mobility mode in accordance with the exemplary embodiments of the invention, as described above, such as received from the user equipment 20 and/or any of the other network devices as illustrated in FIG. 2.

Similarly, the network device 22 includes processing means such as at least one data processor (DP) 22A, storing means such as at least one computer-readable memory (MEM) 22B storing at least one computer program (PROG) 22C, and may also comprise communicating means for bidirectional communication with the other devices via one or more antenna 24F. Such communications via the antenna 24F can include at least paging and/or UE mode indication signaling as in accordance with the exemplary embodiments. Similar to the network device 21 the network device 22 is at least enabled, using the user mode function 22G, to perform the operations including at least processing the indication of autonomous mobility mode (AM) or user equipment controlled mobility mode in accordance with the exemplary embodiments of the invention, such as received from the user equipment 20 and/or any of the other network devices as illustrated in FIG. 2.

The network device 24 includes its own processing means such as at least one data processor (DP) 24A, storing means such as at least one computer-readable memory (MEM) 24B storing at least one computer program (PROG) 24C, and may also comprise communicating means such as a transmitter TX 24D and a receiver RX 24E for bidirectional wireless communications with devices 20, 21, and 22 as detailed above via its antennas 24F. Such communications via the antenna 24F can include at least paging and/or UE mode indication signaling as in accordance with the exemplary embodiments. Thus, similar to the network device 22 is at least enabled, using at least the UE mode function 24G, to perform the operations including at least processing the indication of autonomous mobility mode (AM) or user equipment controlled mobility mode, such as received from the user equipment 20 and/or any of the other network devices as illustrated in FIG. 2 in accordance with the exemplary embodiments of the invention.

At least one of the PROGs 20C, 21C, 22C and 24C in the respective device 20, 21, 22 and 24 is assumed to include program instructions that, when executed by the associated DP 20A, 21A, 22A and 24A enable the respective device to operate in accordance with the exemplary embodiments of this invention, as detailed above. Blocks 20G, 21G, 22G and 24G summarize different results from executing different tangibly stored software to implement certain aspects of these teachings. In these regards the exemplary embodiments of this invention may be implemented at least in part by computer software stored on the MEM 20B, 21B, 22B and 24B which is executable by the DP 20A, 21A, 22A and 24A of the respective other devices 20, 21, 22 and 24 or by hardware, or by a combination of tangibly stored software and hardware (and tangibly stored firmware). Electronic devices implementing these aspects of the invention need not be the entire devices as depicted at FIG. 2, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 21B, 22B and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 21A, 22A and 24A include but are not limited to general purpose computers, special purpose computers, microprocessors, digital signal processors (DSPs) and multi-core processors.

The exemplary embodiments of the invention enable the features as at least shown in FIG. 1A. These features according to the exemplary embodiments of the invention as shown in FIG. 1A include:

105) UE enters to UE controlled mobility mode based on predefined trigger (can be e.g. a timer, explicit signaling between UE and NW, however not the main idea of this invention), eNB is in synch with the transition to this mode;

110) Mobility is based on UE decision (like cell re-selections) by the UE and UE listens for paging; UE may also listen PDCCH (e.g. if the serving cell has not changed);

115) Needed information for the RRC connection i.e. UE context is maintained both in the UE and eNB;

120) eNB informs core network about the UE controlled mobility mode

125) For MT data and/or other data the core network initiates paging procedure (optimized for the new mode), eNBs are made aware of the UEs mobility mode;

130) If the UE is not reached in the cell where previous data transfer occurred paging will be sent in a larger area; the principle how the paging will be sent can be optimized for the now mobility mode. Alternatively, paging is sent in a predefined area in a first attempt;

135) UE responds to the paging with connection re-establishment request; alternatively connection establishment procedure can be used;

140) UE context is requested from the previous serving cell; alternatively, previous serving cell makes 'forward preparation' of cells by providing UE context to eNBs where the UE most likely may have moved between the data transmissions, the eNB:s may be any kind of pre-determined list of eNBs to which UE then can make successful re-establishment; and/or 145) No security or re-configuration signaling required once the connection is resumed in the new cell In accordance with the embodiments, as shown in FIGS. 3, 4, 5, and 6 as described below, there can be variations of these procedures, and not all steps/operations are mandatory.

FIGS. 3, 4, 5, and 6

Figure 5A:
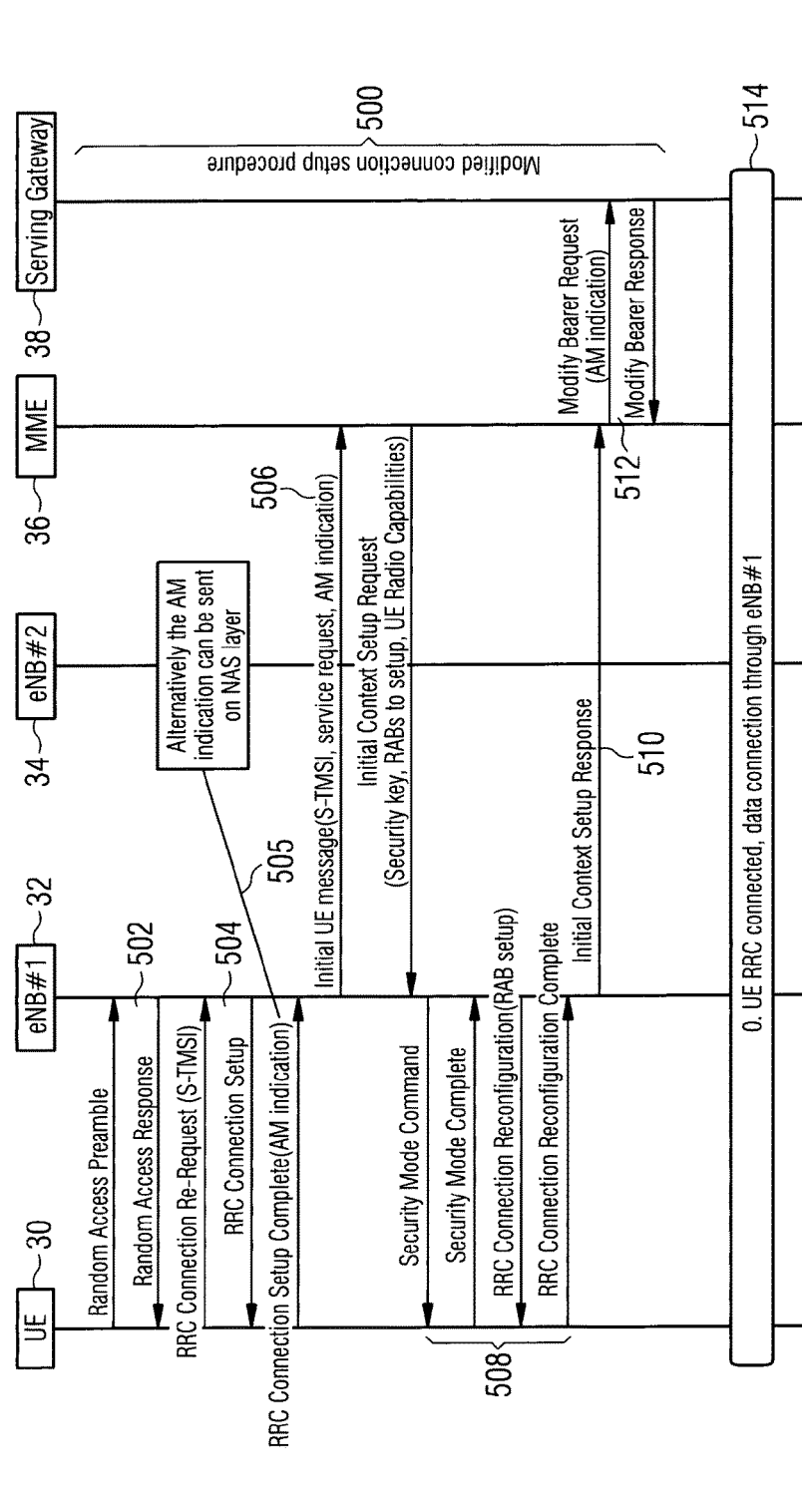

The exemplary embodiments of the invention will be described in further detail below with reference to FIGS. 3, 4, 5, and 6. FIGS. 3, 4, 5, and 6 each illustrate a signaling diagram associated with a different alternative operation in accordance with the exemplary embodiments of the invention. It is noted that the UE and the eNB#1 as referred to in FIGS. 3, 4, 5, and/or 6 can be for example the user device 20 and the network device 21, respectively, as in FIG. 2. Further, any reference to an autonomous mobility mode (AM) in the Figures and/or description can be interpreted as user equipment controlled mobility mode in accordance with the exemplary embodiments as described herein, An optimum choice of these alternative operations depends on a mobility scenario and also on a traffic pattern associated with user equipment. There can be either early (as in FIG. 4 or option B) or late (FIG. 3 or option A) indication about the UE controlled mobility. Alternatively, the UE is configured/allowed to use UE controlled mobility during the connection setup (FIG. 5 or option C). There is some variation about the user plane handling with the options.

FIG. 3 Option A

As illustrated in FIG. 3 (may be referred to as Option A) at step 310 the UE 30 is in an RRC connected state through the eNB#1 32. As illustrated in step 320 it is determined that data arrival has stopped for a period of time but the RRC connection is not released. At this stage the UE 30 enters an autonomous mobility mode (AM). As similarly stated above this AM mode is a user equipment controlled mobility mode. In accordance with the exemplary embodiments the entering of the AM mode or user equipment controlled mobility mode can be based on a timer, such as a timer and a threshold of the UE 30 may be used to enter or leave a mode such as based on a time and/or data detection. In accordance with the exemplary embodiments a network device such as the eNB#1 can have a similar and/or corresponding timer. At step 322 a cell reselection for the UE 30 is initiated by the UE 30. Further as shown in step 330 there is an arrival of mobile terminated (MT) data at the serving gateway 38. It is noted that the point of arrival for such MT data as illustrated in FIGS. 3, 4, 5, and/or 6 is non-limiting and the data may be any kind of data destined for a device such as the UE 30. Further, the MT data may arrive via another device of a network associated with the UE 30. At step 335 the MT data is sent towards the UE 30. At step 340 it is shown that there is no response from the UE 30 in the cell it has connected to. Then in step 345 an E_RAB release message is sent from the eNB#1 32 towards the MME 36. In accordance with the exemplary embodiments this release message can include an indication of a mode, such as the AM mode, of the UE 30. In accordance with the exemplary embodiments at step 350 a network device such as the MME 36 knowing that the UE 30 is in the AM mode sends paging to a, defined paging area. It is noted that the defined paging area can be different than a tracking area (TA) associated with the network device or MME 36 that is sending such paging. At step 355 an indication of the paging is received by the UE 30. As shown in step 360 a cell reselection or handover to eNB#2 34 is determined needed and a context and data exchange between the eNB#1 32 and eNB#2 34 for the UE 30. Then an exchange including a random access preamble request/response exchange 375 between the UE 30 and the eNB#2 34 follows. At step 380 as in accordance with the exemplary embodiments of the invention the UE 30 can proceed with a re-establishment procedure with the eNB#2 34 after being in the AM or user equipment controlled mobility mode. Step 390 illustrates remaining processed for the re-establishment, and in step 395 the RRC and data connection through the eNB#2 34 for the UE 30 is established.

In accordance with the exemplary embodiments of the invention as associated with FIG. 3 Option A as described above there is at least:

"Late reaction" to UE controlled mobility: MME is informed about the new mode first when the UE is not reachable in the previous cell.
As illustrated in FIG. 3 in step 320 the UE has entered the AM mode. With the MT data of step 335 sent towards the UE 30 there is no response from the UE 30 as indicated in step 340. In step 345 although there is a "late reaction" considering the MT data exchange attempt the MME 36 is still informed of the AM mode or a controlled mobility mode of the UE 30 first after the UE 30 enters the AM mode in step 320;

UE is initially assumed to locate in the source (previous serving) cell i.e. in the coverage area of eNB#1;

Optimum operation for stationary and slowly moving UEs: Including a higher probability to reach UE in the cell where previous data transfer took place;
The MME 36 knowing that the UE 30 is in the AM mode sends paging to a defined area as in step 350;

Some delay in getting the connection established in the new cell;

UP handling basically the same as with HO signalling; and/or

There could be various options for MME to send paging knowing that UE has entered the new mode such as:
Paging could be sent in gradually increasing area, not immediately via the whole TA
Could depend on time since last data transfer, UE mobility, etc

FIG. 4 Option B

As illustrated in FIG. 4 (may be referred to as Option b) at step 410 the UE 30 is in an RRC connected state through the eNB#1 32. As illustrated in step 420 it is determined that data arrival has stopped for a period of time but the RRC connection is not released. At this stage the UE 30 enters an autonomous mobility mode (AM). As similarly stated above this AM mode is a user equipment controlled mobility mode. In accordance with the exemplary embodiments the entering of or switch to AM mode or user equipment controlled mobility mode can be based on a timer, such as a timer used to trigger an end of a mode associated with the UE 30. In accordance with the exemplary embodiments a network device such as the eNB#1 can have a similar and/or corresponding timer. In step 421 an indication that the UE 30 is in the AM mode is sent towards the MME 36 and further to the serving gateway 38. At step 422 a cell reselection for the UE 30 is initiated by the UE 30. Further as shown in step 430 there is an arrival of mobile terminated (MT) data at the serving gateway 38. As previously indicated the data may be any kind of data destined for a device such as the UE 30. It is noted that the point of arrival for such MT data as illustrated in FIGS. 3, 4, 5, and/or 6 is non-limiting and the MT data may arrive via another device of a network associated with the UE 30. At step 432, in accordance with the exemplary embodiments of the invention, instead of a data transfer towards the UE 30 for the MT data a paging request is sent. In accordance with the exemplary embodiments as shown in step 434 the paging could be sent initially to the ENB#1 only. At step 435 the eNB#2 34 sends a paging (UE ID) towards the UE 30. As indicated in step 436 context exchange operations between the eNB#2 34 and the eNB#1 32 may not be needed if the eNB#2 24 is part of a prepared cell. Then steps 470 communications associated with random access preamble and re-establishment request communications between the eNB#2 34 and the UE 30 occur. Notably, the steps of 470 may only be needed if the UE 30 moves to a coverage area of the eNB#2 34 for example. As illustrated in point/step 480 in accordance with the exemplary embodiments of the invention the UE 30 can proceed with the re-establishment procedure after being in the AM or user equipment controlled mobility mode. The steps 490 illustrate communications between the eNB#2 34, the MME 36, and/or the serving gateway 38 regarding path reselection and bearer modification for the re-establishment. Then at step 492 the MT data as received per step 430 is transferred to the UE 30. In step 495 the RRC and data connection through the eNB#2 34 for the UE 30 is established.

In accordance with the exemplary embodiments of the invention as associated with FIG. 4 Option B as described above there is at least:

Enable "Early reaction" of UE controlled mobility: The MME is informed immediately by the source eNB about UE entering the 'UE controlled mobility' mode, In this scenario the UE mode information is provided to the eNB#1 32 and/or eNB#2 34 while the RRC connection with the UE 30 is not released. In addition, the MME and SGW are notified prior to the MT data arriving. In this scenario the SGW 38 does not just forward the MT data towards the UE 30, but sends a Downlink Data Notification (DDN) to MME which triggers paging request from the MME 36 towards the cell (e.g., eNB#1 32) that the UE 20 was last associated. Alternatively, the first paging can be sent also to a wider area than that of the previous cell associated with the eNB#1 32. The MT data is sent from the serving gateway 38 only after the UE 30 has been located and the data path has been switched to the eNB#2 34. The MT data is sent from SGW to eNB then to the UE. The MME only works for control plane signaling. In this case, the SGW does not just forward the MT data towards the eNB but sends a Downlink Data Notification towards MME; consequently the MME will send a paging request towards the cell.

As such the MT data transferring is performed with minimized complexity based on knowledge that the UE 30 is in an AM or user equipment controlled mobility mode;

Optimize UE controlled mobility detection for moving UEs such as those with a high probability of UE being in a new cell;

Some delay in getting the connection established in the new cell; However faster procedure than with option A;

Provide for less signalling for UP handling; and/or

Provide advanced options for paging (similar to A).

FIG. 5 Option C

FIG. 5 illustrates a signaling diagram associated with another method which may be performed by an apparatus in accordance with the exemplary embodiments of the invention. Steps 500 of FIG. 5 illustrate a modified connection setup procedure in accordance with the exemplary embodiments of the invention. As illustrated in steps 502 and 504 there are random access preamble and RRC connection establishment procedures/communications between the UE 30 and the eNB#1 32. As indicated in step 505 following or included with an RRC connection setup complete indication there is provided by the UE 30 an indication of a user equipment mode of the UE 30, such as an indication of an AM and/or user equipment controlled mobility mode of the UE 30. In accordance with the exemplary embodiments this indication may be sent on a NAS layer. In step 506 the eNB#1 32 sends towards the MME 36 an initial UE message service request including an indication of the AM mode of the UE 30. In steps 508, following an initial context setup message from the MME 36, the eNB#1 32 and the UE 30 establish a security mode and RRC connection reconfiguration. At step 510 an initial context setup response is sent towards the MME 36. Then as illustrated in step 512 the MME 36 and the serving gateway 38 modify a bearer for signaling. The AM indication in a modify bearer request message is used to inform the SGW the capability for supporting the AM mode in UE. Step 514 illustrates that the UE 30 is RRC connected with a data connection through eNB#1 . In step 520 data arrival stops for a while but the RRC connection is not released. In accordance with the exemplary embodiments a timer and threshold of the UE 30 may be used to set or leave a mode based on the data detection, and whether the user equipment remains in a particular mode, such as the AM mode, can be based on the timer threshold. Similarly, in accordance with the exemplary embodiments a corresponding timer may be included in the eNB#1 and/or eNB#2 . Then as an option in step 522 an E_RAB release message is sent from the eNB#1 32 towards the MME 36. Further as indicated in step 522 the AM mode indication sent towards the MME does not immediately release the bearer. In accordance with the exemplary embodiments this release message can include an indication of a mode, such as the AM mode, of the UE 30. As indicated in step 524 the optional message may be forwarded to the SGW. The optional message(s) may be sent if dynamic behavior is allowed and/or wanted. Step 526 illustrates a determining of a cell re-selection for the UE 30 to the eNB#2 . Optionally at step 528 the eNB#1 32 performs forward preparation. At step 530 MT data arrives at the SGW 38 for the UE 30. In step 532 the SGW 32 sends a paging request downlink data notification (DDN) towards the MME 36. In accordance with the exemplary embodiments of the invention as illustrated in step 534 the MME knowing that the UE 30 is in the AM mode sends paging to a defined paging area. In accordance with the exemplary embodiments as indicated in step 534 the paging area can be different than a tracking area (TA) and/or also include the eNB#1 32. The paging area can also be the last serving cell if for example a gradual increase of the paging area in a successive paging attempt is used. As indicated in step 536 and in accordance with the exemplary embodiments of the invention the paging includes an indication of the AM mode of the UE 30 and a cell ID of the eNB#1 32. At step 538 there is paging by the eNB#2 34 including an ID of the UE 30. As shown in steps 540 the eNB#1 32 can release the UE 30 context to the eNB#2 34. Steps 570 illustrate an exchange including a random access preamble request/response and RRC connection re-establishment exchange between the UE 30 and the eNB#2 34. In steps 590 there is a switch of a downlink (DL) path. In accordance with the exemplary embodiments of the invention as indicated with step 590B an end marker to the eNB#1 32 is not needed as there is no data forwarding and the eNB#1 has cleared the UE context. Then as illustrated in step 592 the MT data is transferred towards the UE 30 via the eNB#2 34. As illustrated in step 595 there is established an RRC and data connection through the eNB#2 34.

Figure 6B:
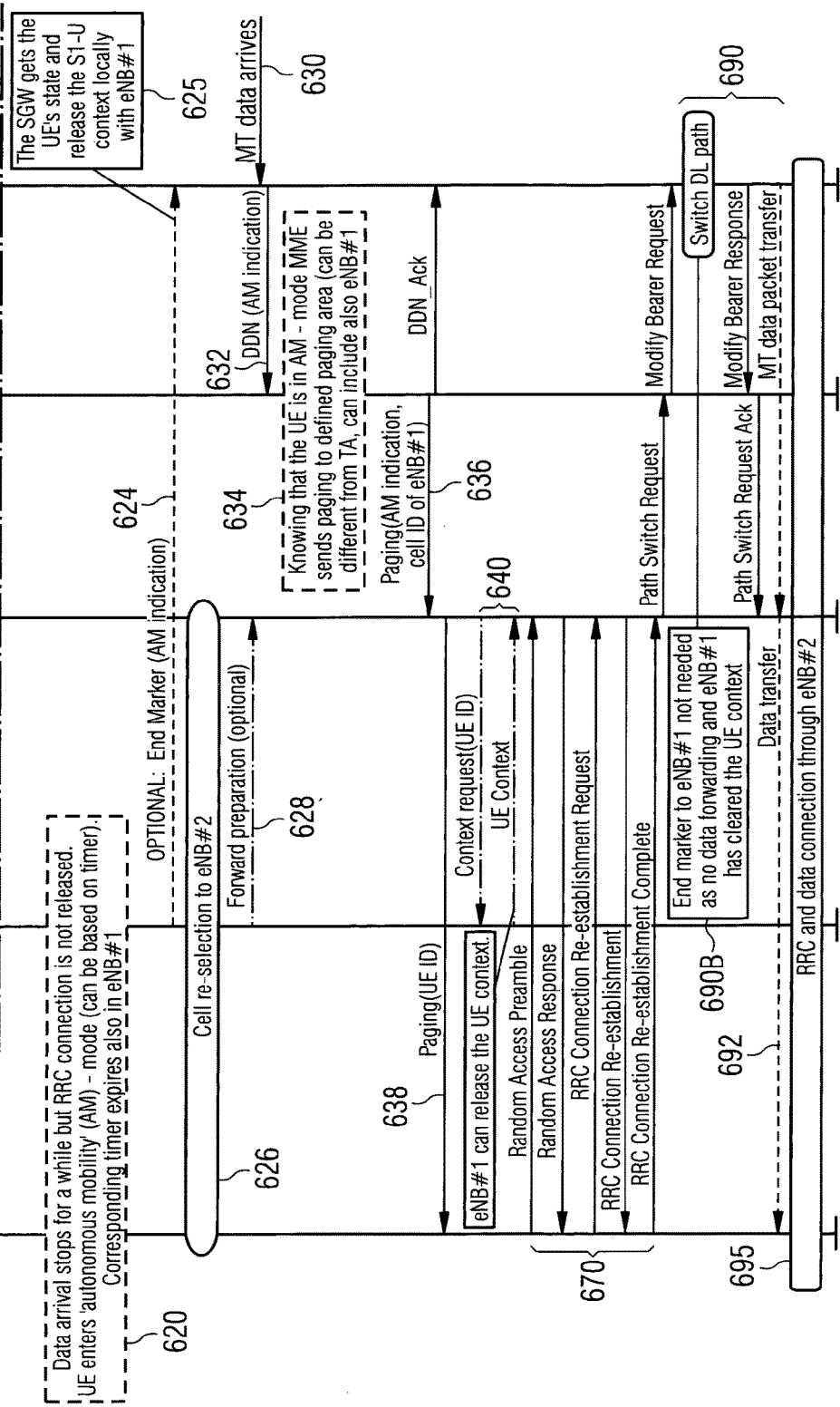

In accordance with the exemplary embodiments of the invention as associated with FIG. 5 Option C as described above there is:
- SGW is informed about the AM mode including at least two options possible:
  - AM indication during the service request signalling
  - Dynamic indication each time the AM timer expires at the eNB
- The AM mode can be continuous (based on indication during the service request) or dynamic according to traffic pattern; and/or
- There is a similar UP and/or DL path handling benefit as in option B:
  - No data forwarding required FIG. 6 Modified Option C FIG. 6 illustrates a signaling diagram associated with another method which may be performed by an apparatus in accordance with the exemplary embodiments of the invention. Steps 600 of FIG. 6 illustrate a modified connection setup procedure in accordance with the exemplary embodiments of the invention. As illustrated in steps 602 and 604 there are random access preamble and RRC connection establishment procedures/communications between the UE 30 and the eNB#1 32. As indicated in step 605 following or included with an RRC connection setup complete indication there is provided by the UE 20 of an AM and/or user equipment controlled mobility mode by the UE 30. In accordance with the exemplary embodiments this indication can be sent on a non-access stratum (NAS) layer. In step 606 the eNB#1 32 sends towards the MME 36 an initial UE message service request including an indication of the AM mode of the UE 30. In steps 608, following an initial context setup message from the MME 36, the eNB#1 32 and the UE 30 establish a security mode and RRC connection reconfiguration. At step 610 an initial context setup response is sent towards the MME 36. Then as illustrated in step 612 the MME 36 and the serving gateway 38 modify a bearer for signaling. The AM indication in a modify bearer request message is used to inform the SGW the capability for supporting the AM mode in UE. Step 614 illustrates that the UE 30 is RRC connected with a data connection through eNB#1 . In step 620 data arrival stops for a while but the RRC connection is not released. In accordance with the exemplary embodiments a timer and threshold of the UE 30 may be used to set or leave a mode based the data detection, and whether the user equipment remains in a particular mode, such as the AM mode, can be based on the timer threshold. Similarly, in accordance with the exemplary embodiments a corresponding timer may be included in the eNB#1 and/or eNB#2 . In an optional step 624 there is an indication of the AM mode of the UE 30 sent from the eNB#1 32 to the SGW 38. As indicated in step 625 the serving gateway (SGW) 38 gets the indication and releases the S1-U context locally with the eNB#1 32. Step 626 illustrates a determining of a cell re-selection for the UE 30 to the eNB#2 . Optionally at step 628 the eNB#1 32 performs forward preparation. At step 630 MT data arrives at the SGW 38 for the UE 30. In step 632 the SGW 32 sends a downlink data notification (DON) with an indication of the AM mode of the UE 30 towards the MME 36. In accordance with the exemplary embodiments of the invention as illustrated in step 634 the MME knowing that the UE 30 is in the AM mode send paging to a defined paging area. In accordance with the exemplary embodiments as indicated in step 634 the paging area can be different than a tracking area (TA) and/or also include the eNB#1 32. The paging area can also be the last serving cell if for example a gradual increase of the paging area in a successive paging attempt is used. As indicated in step 636 and in accordance with the exemplary embodiments of the invention the paging includes an indication of the AM mode of the UE 30 and a cell ID of the eNB#1 32. At step 638 there is paging by the eNB#2 34 including an ID of the UE 30. Using the eNB#1 ID the eNB#2 can optionally request the UE context from the previous serving cell. The context request may be done also after the UE has responded to the paging i.e. only by the eNB#2 and not by the other eNB's that have sent the paging. As shown in steps 640 the eNB#1 32 can release the UE 30 context. Steps 670 illustrate an exchange including a random access preamble request/response and RRC connection re-establishment exchange between the UE 30 and the eNB#2 34. In step 690 there is a switch of a downlink (DL) path. In accordance with the exemplary embodiments of the invention as indicated with step 690B an end marker to the eNB#1 32 is not needed as there is no data forwarding and the eNB#1 has cleared the UE context. Then as illustrated in step 692 the MT data is transferred towards the UE 30 via the eNB#2 34. As illustrated in step 695 there is established an RRC and data connection through the eNB#2 34.

In accordance with the exemplary embodiments of the invention as associated with FIG. 6 Modified Option C as described:
- The difference to Option C is that indication about the AM mode is informed directly to the SGW using the End Marker;
- Another difference with the signaling diagrams of FIG. 5 Option C is that in Option C the indication from the eNB#1 about the AM mode of the UE is sent to the MME (step 522) and forwarded to the SGW (step 524), whereas in FIG. 6 modified Option C the indication about the AM mode is sent to the SGW (step 624); and/or
- SGW is further informing MME about the AM mode when MT data arrives and paging has to be sent. The indication about the AM mode can be included in the DDN message It is noted that there can be various other combinations of the options both how the signaling between the network nodes is done and how the user plane is handled. Messages used between eNB and MME for this operation can include existing messages or there can be specified new messages. Same applies to MME-SGW signaling.

Figure 7A:
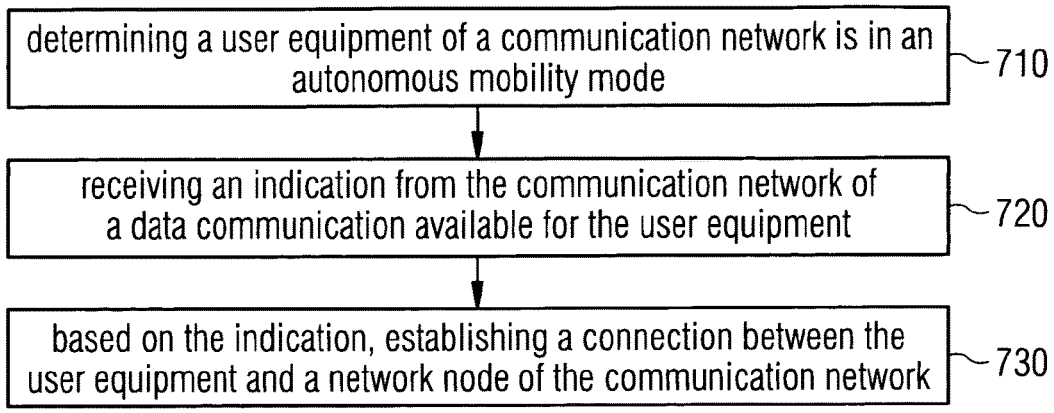
FIGS. 7A, 7B, and 7C each illustrate a simple block diagram describing a method in accordance with an exemplary embodiment of the invention.
Figure 7B:
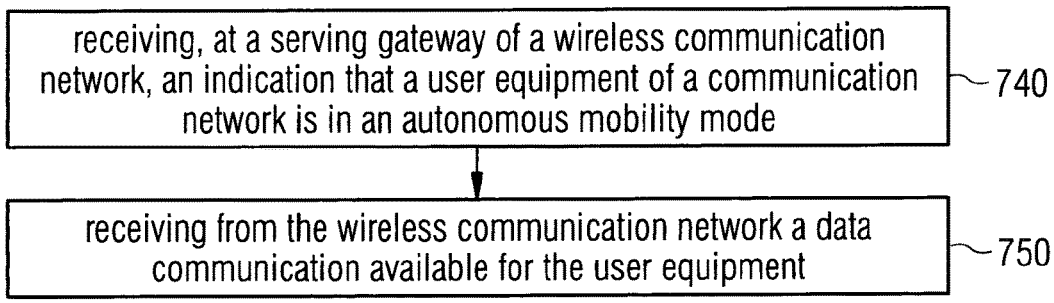
Figure 7C:
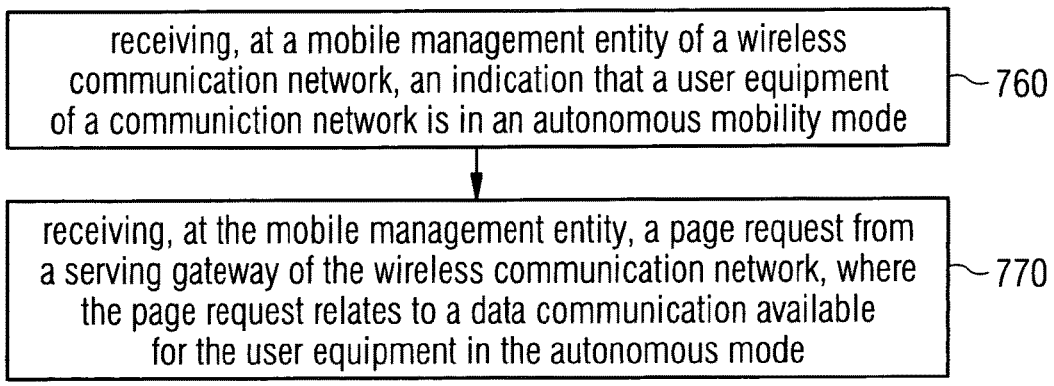

FIGS. 7A, 7B, and 7C each include block diagrams illustrating a method which may be implemented by an apparatus in accordance with the exemplary embodiments of the invention.

FIG. 7A illustrates a method which may be performed by a device such as the user device 20 or a network device 21, 22, or 24 as in FIG. 2. In regards to FIG. 7A, at block 710 there is a step of determining a user equipment of a communication network is in an autonomous mobility mode. At block 720 there is receiving an indication from the communication network of a data communication available for the user equipment. Then at block 730 there is, based on the indication, establishing a connection between the user equipment and a network node of the communication network.

In accordance with the exemplary embodiments as described in the paragraph above, where there is a radio resource control connection between the user equipment and the network node, and where information for the radio resource control connection is maintained during the autonomous mobility mode.

In accordance with the exemplary embodiments as described in the paragraph above, the establishing comprises reestablishing based on the indication the radio resource control connection between the user equipment and the network node.

In accordance with the exemplary embodiments as described in the paragraphs above, where the determining comprises communicating an indication of the autonomous mobility mode of the user equipment with the communication network.

In accordance with the exemplary embodiments as described in the paragraphs above, where the communicating is towards one of a mobility management entity and a serving gateway of the communication network.

In accordance with the exemplary embodiments as described in the paragraphs above, where a cell reselection to a target cell is initiated by the user equipment in the autonomous mobility mode while the connection is established.

In accordance with the exemplary embodiments as described in the paragraphs above, where the target cell is made aware of the autonomous mobility mode such that the target cell is enabled to proceed with re-establishment signaling In accordance with the exemplary embodiments as described in the paragraphs above, where the indication from the communication network comprises a page directed to a defined paging area associated with multiple cells, where the multiple cells can comprise a source cell.

In accordance with the exemplary embodiments as described in the paragraphs above, where the network node is associated with another cell, and the method further comprising communicating with the another cell a release message and forward preparation data for the cell reselection for the user equipment.

In accordance with the exemplary embodiments as described in the paragraphs above, where the determining is based on a stoppage of a data communication between the user equipment and the network node.

In accordance with the exemplary embodiments as described in the paragraphs above, where the determining is based on an expiration of a timer associated with the stoppage of the data communication between the user equipment and the network node.

In accordance with the exemplary embodiments as described in the paragraphs above, where an indication of the autonomous mobility mode for the user equipment is communicated with the communication network based on the stoppage.

In accordance with the exemplary embodiments as described in the paragraphs above, where the indication is communicated with at least one of a mobility management entity, a serving gateway via a mobility management entity, and directly to a serving gateway.

The exemplary embodiments as described in the paragraphs above performed by one of the user equipment and the network node.

In accordance with the exemplary embodiments as described in the paragraphs above, where the establishing enables communicating the data communication with the user equipment.

FIG. 7B illustrates a method which may be performed by a device such as a serving gateway. This device may be embodied in a device such as the network device 21, 22, or 24 as in FIG. 2. In regards to FIG. 7B, at block 740 there is receiving, at a serving gateway of a wireless communication network, an indication that a user equipment of a communication network is in an autonomous mobility mode. At block 750 there is receiving from the wireless communication network a data communication available for the user equipment.

In accordance with the exemplary embodiments as described in the paragraph above, where the indication is received from a mobile management entity of the wireless communication network.

In accordance with the exemplary embodiments as described in the paragraphs above, where the indication from the mobile management entity is using control plane signaling.

In accordance with the exemplary embodiments as described in the paragraphs above, there is sending, based on the receiving, a downlink data notification towards the mobile management entity, where the downlink data notification to the mobile management entity comprises a page request for a page regarding the data communication.

In accordance with the exemplary embodiments as described in the paragraphs above, where the page is directed to a defined paging area.

In accordance with the exemplary embodiments as described in the paragraphs above, there is receiving a release message, where the defined paging area is associated with one of a last known location of the user equipment and a new cell reselected for the user equipment.

FIG. 7C illustrates a method which may be performed by a device such as a mobile management entity. This device may be embodied in a device such as the network device 21, 22, or 24 as in FIG. 2. In regards to FIG. 7C, at block 760 there is receiving, at a mobile management entity of a wireless communication network, an indication that a user equipment of a communication network is in an autonomous mobility mode. Then at block 770 there is receiving, at the mobile management entity, a page request from a serving gateway of the wireless communication network, where the page request relates to a data communication available for the user equipment in the autonomous mode.

In accordance with the exemplary embodiments as described in the paragraphs above, where the page request comprises a downlink data notification and where the page request is using control plane signaling.

In accordance with the exemplary embodiments as described in the paragraphs above, there is sending, based on the page request, a page towards the wireless communication network indicating that the data communication is available for the user equipment.

In accordance with the exemplary embodiments as described in the paragraphs above, where the page is directed to a defined paging area.

In addition, in accordance with an exemplary embodiment of the invention there is an apparatus comprising at least one processor, and at least one memory including computer program code, where the at least one memory and the computer program code are configured, with the at least one processor, to cause the apparatus to perform the methods in accordance with the exemplary embodiments of the invention as described herein.

The exemplary embodiments of the invention as described herein provide at least the advantages of reduced signaling overhead with UE controlled mobility mode, minimized mobility and state transitions signaling, there is no need for security and re-configuration signaling after cell changes, and provides for optimized paging procedures for data such as but not limited to MT data.

In addition, it is noted that the user device, such as the UE 20 of FIG. 2, may be any device associated with a data/communication network. In general, the various embodiments of a device in accordance with the exemplary embodiments can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Further, although the exemplary embodiments as described herein may refer to transferring and receiving mobile terminated (MT) data this is non-limiting. The exemplary embodiments of the invention may be used for advantage in the transfer of any kind of data communication and/or signaling such as for a device as described above.

The embodiments of this invention may be implemented by computer software executable by a data processor of the user equipment 30, such as the data processor 20A, or by hardware, or by a combination of software and hardware. Further in this regard it should be noted that the various blocks of the logic flow diagram of FIG(s). 1A may represent program steps, or interconnected logic circuits, blocks and functions, or a combination of program steps and logic circuits, blocks and functions. It is noted that any of these devices may have multiple processors (e.g. RF, baseband, imaging, user interface) which operate in a slave relation to a master processor. The teachings may be implemented in any single one or combination of those multiple processors.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
one or more processors and one or more memories including a computer program code, wherein the one or more memories and the computer program code are configured with the one or more processors to cause the apparatus to at least:
provide a notification to a core network of a wireless communication network about an autonomous mobility mode of a user equipment of a wireless communication network;
determine that the user equipment of the wireless communication network is in the autonomous mobility mode;
receive an indication from the wireless communication network of a data communication available for the user equipment; and
based on the indication, establish a connection between the user equipment and a network node of the wireless communication network for the data communication,
where the indication from the wireless communication network comprises at least one page directed to a defined paging area associated with multiple cells, and where the defined paging area is a gradually increasing paging area for each successive page of the at least one page.

2. The apparatus according to claim 1, wherein there is a radio resource control connection between the user equipment and the at least one other network node, and where information for the radio resource control connection is maintained during the autonomous mobility mode, and the establishing comprises reestablishing based on the indication the radio resource control connection between the user equipment and the at least one other network node, and where the establishing enables communicating data with the user equipment.

3. The apparatus according to claim 1, wherein the one or more memories and the computer program code are configured with the one or more processors to cause the apparatus further to:
provide a forward preparation message to the at least one other network node for notifying about the autonomous mobility mode such that the at least one other network node is enabled to proceed with re-establishment signaling from the user equipment, wherein the forward preparation message comprises context of the user equipment.

4. The apparatus according to claim 1, where the indication is communicated using control plane signaling.

5. The apparatus according to claim 1, where the determining is based on a stoppage of a data communication between the user equipment and the apparatus.

6. The apparatus according to claim 1, where the determining is based on an expiration of a timer associated with the stoppage of the data communication between the user equipment and the apparatus.

7. The apparatus according to claim 1, where the notification of the autonomous mobility mode of the user equipment is communicated to the core network based on a stoppage of data communication.

8. The apparatus according to claim 1, where the notification is communicated with at least one of a mobility management entity, a serving gateway via a mobility management entity, and directly to a serving gateway.

9. The apparatus according to claim 1, where the apparatus comprises a base station of the wireless communication network.

10. The apparatus of claim 1, wherein the notification to the core network is provided in service request signalling.

11. The apparatus of claim 1, wherein providing the notification to the core network comprises sending a radio bearer release message to a mobile management entity of the core network, wherein the radio bearer release message comprises the notification that the user equipment is in the autonomous mobility mode and causes the mobile management entity to modify an area for paging.

12. The apparatus of claim 1, wherein providing the notification to the core network comprises sending an end marker message to a serving gateway of the core network, wherein the end marker message comprises the notification that the user equipment is in the autonomous mobility mode and causes the S1-U context to be released at the serving gateway.

13. The apparatus of claim 1, wherein the notification is provided to the core network after the user equipment has not been reached in a cell of the apparatus.

14. The apparatus of claim 1, wherein the notification is provided to the core network substantially upon determining that the user equipment is currently in the autonomous mobility mode.

15. The apparatus of claim 1, wherein the one or more memories and the computer program code are configured with the one or more processors to further cause the apparatus to:
receive a notification of the autonomous mobility mode from the user equipment in a radio resource connection setup complete message.

* * * * *

UNITED STATES PATENT AND TRADEMARK OFFICE
CERTIFICATE OF CORRECTION

PATENT NO. : 10,075,995 B2
APPLICATION NO. : 15/024876
DATED : September 11, 2018
INVENTOR(S) : Yan Ji Zhang, Ilkka Keskitalo and Jussi-Pekka Koskinen It is certified that error appears in the above-identified patent and that said Letters Patent is hereby corrected as shown below:

In the Claims

In Claim 1:
Column 20, Line 47, "defined" should be deleted and --predefined-- should be inserted.

Signed and Sealed this
Sixteenth Day of October, 2018

Andrei Iancu
*Director of the United States Patent and Trademark Office*